United States Patent [19]

Tabata

[11] Patent Number: 5,420,717
[45] Date of Patent: May 30, 1995

[54] ADJUSTABLE-CONTRAST MICROSCOPE

[75] Inventor: Seiichiro Tabata, Tokyo, Japan

[73] Assignee: Olympus Optical Co., Ltd., Tokyo, Japan

[21] Appl. No.: 18,428

[22] Filed: Feb. 17, 1993

[30] Foreign Application Priority Data

Feb. 18, 1992 [JP] Japan .................................. 4-031062

[51] Int. Cl.$^6$ ......................... G02B 21/14; G02B 5/30; G02B 27/28
[52] U.S. Cl. .................................... 359/371; 359/386; 359/495
[58] Field of Search ............... 356/351, 364, 365, 367; 359/370, 371, 386, 494–499

[56] References Cited

U.S. PATENT DOCUMENTS

| 4,129,357 | 12/1978 | Title | 358/157 |
|---|---|---|---|
| 4,309,110 | 1/1982 | Tumerman | 356/366 |
| 4,795,246 | 1/1989 | Lord | 359/371 |
| 4,881,815 | 11/1989 | Sommargren | 356/349 |
| 4,964,707 | 10/1990 | Hayashi | 359/371 |
| 4,969,717 | 11/1990 | Mallinson | 359/301 |
| 5,042,951 | 8/1991 | Gold et al. | 356/364 |
| 5,078,482 | 1/1992 | Feldman et al. | 359/371 |

FOREIGN PATENT DOCUMENTS 52-116256 9/1977 Japan .

OTHER PUBLICATIONS

S. Bradbury, "The Evolution of Microscope", Lecturer in Human Anatomy, Univ. of Oxford, (1967), pp. 301–304.

Primary Examiner—Robert P. Limanek
Assistant Examiner—David B. Hardy
Attorney, Agent, or Firm—Cushman, Darby & Cushman

[57] ABSTRACT

An interference microscope includes a light source, a member for splitting up light from the light source into two components, a member for recombining the two components emerging from a sample, a polarizing plate whose transmission axis is oriented at a predetermined angle with directions of polarization of the two components, and an imaging element for detecting the light transmitted through the polarizing plate. This interference microscope is provided with a member for changing the state of polarization on an optical path from the light source to the splitting member, or an optical path from the recombining member to the imaging element. Thus, the interference microscope allows the setting and adjustment of contrast to be easily performed without affecting an imaging relationship.

25 Claims, 14 Drawing Sheets

ADJUSTABLE-CONTRAST MICROSCOPE

BACKGROUND OF THE INVENTION a) Field of the Invention

This invention relates to an interference microscope, constituting differential interference and phase-contrast types, in which the interference of light is utilized for observing the phase distribution of a sample.

b) Description of the Prior Art

Microscopes in which the interference of light is utilized for observing the phase distribution of a sample are available as phase-contrast and differential interference microscopes. An example of the arrangement of a conventional differential interference microscope is shown in FIG. 1. In this figure, light emitted from a source of light 1 is incident on a Wollaston prism 2, by which the light is split up into two beams vibrating in directions perpendicular to each other. These beams pass through a condenser lens 3 and irradiate a sample 5 on a slide glass 4. The beams are then transmitted through the sample 5 to enter an objective 6, and after having traversed the objective 6, is incident on a Wollaston prism 7. Since the combination of crystals of the Wollaston prism 7 is reversed to that of the Wollaston prism 2, the two beams entering the prism 7 are recombined to overlap. The overlapping beams are transmitted by a polarizing plate 8 oriented at an angle of 45° with the directions of vibrations of these two incident beams, thereby interfering with each other on a CCD 9. Such an interference image represents the differential of phase distribution of the sample. Hence, according to the differential interference microscope, the situation can be observed even in a transparent sample.

Next, the arrangement of a conventional phase-contrast microscope is shown in FIG. 2. Light emitted from the light source 1 travels in such a manner that a part of the light emerges from an annular opening 10 composed of a ring-shaped slit, is converged by a condenser lens 11, and irradiates the sample 5 on the slide glass 4. The light is separated into transmitted light and diffracted light by an objective 12. The transmitted light is transmitted through a phase film 13 with a retardation of $\lambda/4$ and a transparent substrate 14 on which the phase film 13 is evaporated. The diffracted light, on the other hand, passes through the whole of the transparent substrate 14. Consequently, the transmitted light and the diffracted light interfere with each other on the CCD 9. The interference image available here represents a Fourier transform image of the sample 5. Thus, the phase-contrast microscope, like the differential interference microscope, allows the image to be observed even in a transparent sample.

In the foregoing microscopes, provisions have been made for producing the image with contrast which is visible with great ease. For example, the differential interference microscope of a certain type is equipped with such a mechanism that the Wollaston prism 7 can be laterally moved. Specifically, a user can turn a screw with his hand while viewing the image to move the Wollaston prism 7, thereby changing the phase difference between the two interfering beams of light. The user can thus set the optimum contrast. When the Wollaston prism 7 used as a wave recombining means is moved, however, its optical axis is also shifted. This adversely affects an imaging relationship in addition to a contrast. To suppress such behavior, it is necessary to improve the accuracy of straightness of a locus produced by the movement of the Wollaston prism 7. This, however, has been cumbersome and difficult.

As for the phase-contrast microscope, when the phase film 13 is set to have a phase difference of $\lambda/4$, the image is produced with the best contrast. However, since the contrast depends on the thickness of the phase film 13, the user cannot alter the contrast, when once it is set. Hence, the microscope has the disadvantage that even when the user intends to adjust the contrast of interference fringes in observation and examination, he cannot modify the contrast.

SUMMARY OF THE INVENTION

It is, therefore, an object of the present invention to provide an interference microscope in which a contrast can be easily adjusted.

Another object of the present invention is to provide a phase-contrast microscope in which a contrast can be easily adjusted.

The interference microscope according to the present invention includes a differential interference microscope having a light source, a wave separating means for breaking up light from the light source into ordinary and extraordinary components, a wave recombining means for overlapping the ordinary and extraordinary components, a polarizing plate whose transmission axis is oriented at a predetermined angle with the directions of polarization of the ordinary and extraordinary components emerging from an sample, and a detecting means for detecting light transmitted through the polarizing plate. Further, a variable polarization means for changing the state of polarization is disposed on the optical path from the light source to the wave separating means or from the wave recombining means to the detecting means. A variable wavelength means is contained in the light source as a function of changing the wavelength of light to be emitted, or is disposed independent of the light source. In addition, a path-difference producing means for providing the ordinary and extraordinary components with different path lengths is disposed between the light source and the detecting means.

Further, the interference microscope according to the present invention includes a phase-contrast microscope having a light source for irradiating a sample, an interference image producing means for introducing transmitted light and diffracted light emerging from the sample onto the plane of observation to obtain an interference image, and a detecting means for detecting the interference fringes. The phase-contrast microscope further has a variable polarization means disposed between the light source and the detecting means, for changing the state of polarization of light, a first polarized-light extracting means for taking out a particular polarized component from the transmitted light, and a second polarized-light extracting means for taking out a polarized component intersecting with the particular polarized component taken out by the first polarized-light extracting means from the diffracted light.

Still further, the interference microscope according to the present invention includes a phase-contrast microscope having a light source for irradiating a sample and an interference image producing means for introducing transmitted light and diffracted light emerging from the sample onto the plane of observation to obtain an interference image. Further, a variable wavelength means is contained in the light source as a function of changing the wavelength of light to be emitted, or is disposed independent of the light source.

In the differential interference microscope, the ordinary and extraordinary components transmitted by the sample are superposed so that the inference image is detected by the detecting means. The state of polarization and the wavelength of light are changed by using an element capable of changing the state of polarization and by actuating the variable wavelength means. Thus, the setting of contrast and its adjustment can be performed without affecting the imaging relationship.

In the phase-contrast microscope, on the other hand, the phase difference or wavelength of the polarized light is altered by actuating the variable polarization means or the variable wavelength means. Whereby, the setting of contrast and the adjustment can be performed with great ease.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

In accordance with the drawings shown, the embodiments of the present invention will be described below.

Figure 3:
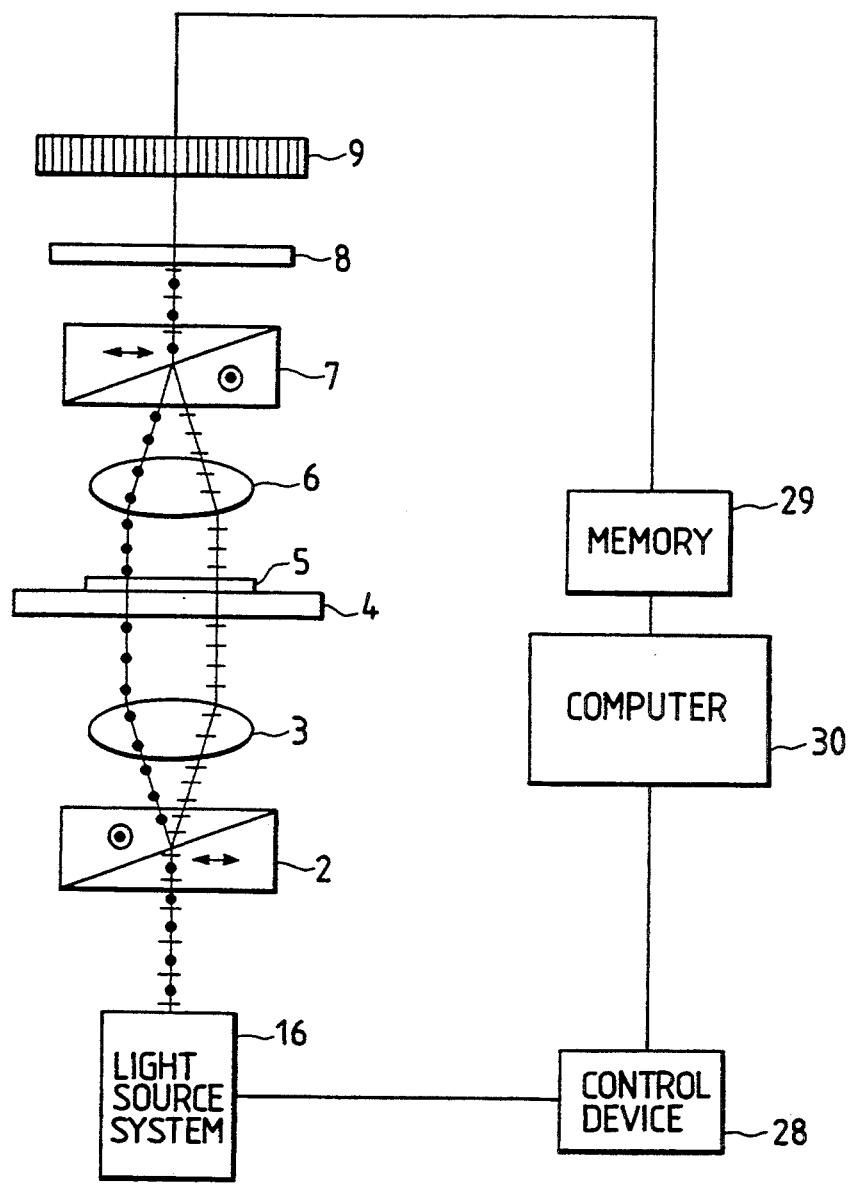
FIG. 3 is a view showing the arrangement of a differential interference microscope which is a first embodiment of the present invention.
Figure 4:
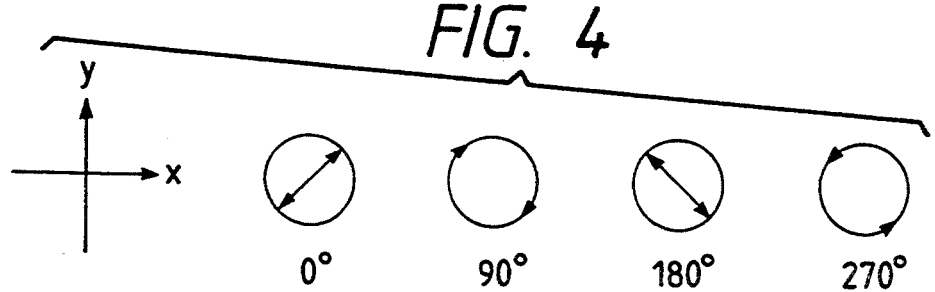
FIG. 4 is a view showing states of polarization where a phase difference between x and y polarized components is changed in 90° steps.

FIGS. 3 and 4 show a first embodiment of the present invention. FIG. 3 is a view showing the arrangement of the differential interference microscope, and FIG. 4 illustrates the states of polarization of light. FIGS. 5 to 8 show various arrangements of a light source system used in the first embodiment.

In the differential interference microscope shown in FIG. 3, a light source system 16 is designed to be capable of altering the state of polarization of light to be emitted. The state of polarization can be revealed when light is resolved into two linearly polarized components, directions of vibration of which are perpendicular to each other. If these two linearly polarized component are referred to as an x polarized component and a y polarized component, an alteration in the state of polarization can be interpreted in such a manner that it is brought about by the change of the phase difference between the x and y polarized components. FIG. 4 shows an example of the relationship between the phase difference between the x and y polarized components and the state of polarization of light into which these components are recombined. When the phase difference between the x and y components is 0°, the recombined light changes to linearly polarized light having a plane of vibration making 45° with the x axis. When it is 90°, the light becomes right-handed circularly polarized light. At 180°, the light becomes linearly polarized light having a plane of vibration making −45° with the x axis. The phase difference of 270° changes the light to left-handed circularly polarized light. Although in this example the amplitudes of the x and y polarized components are set to be equal, different amplitudes brings about elliptically polarized light. The light source system 16 is capable of controlling continuously or discretely the change of the state of polarization.

Figure 5:
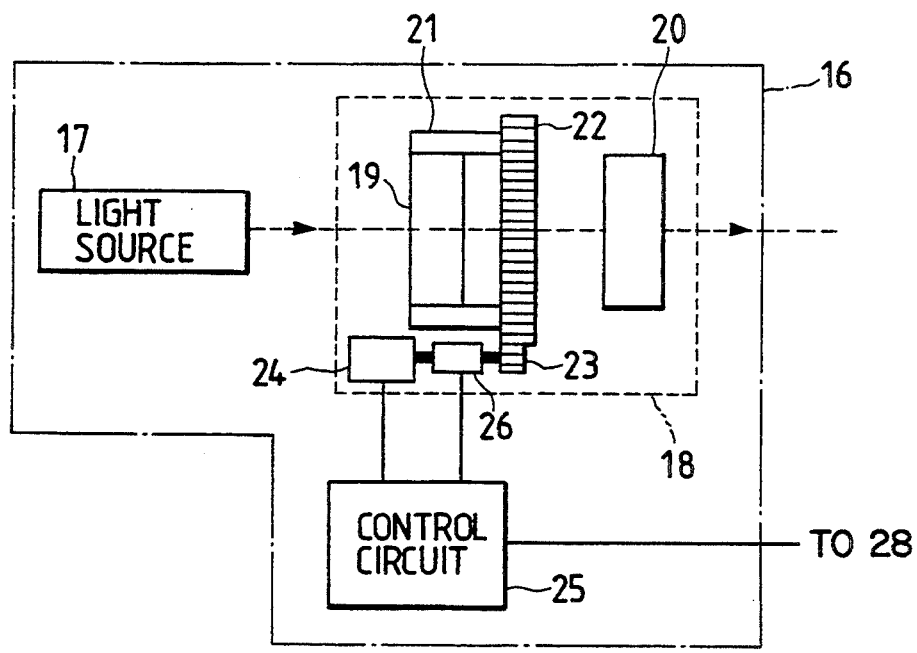
FIGS. 5 to 12 are views showing examples of various arrangements of a light source system in the first embodiment.
Figure 6:
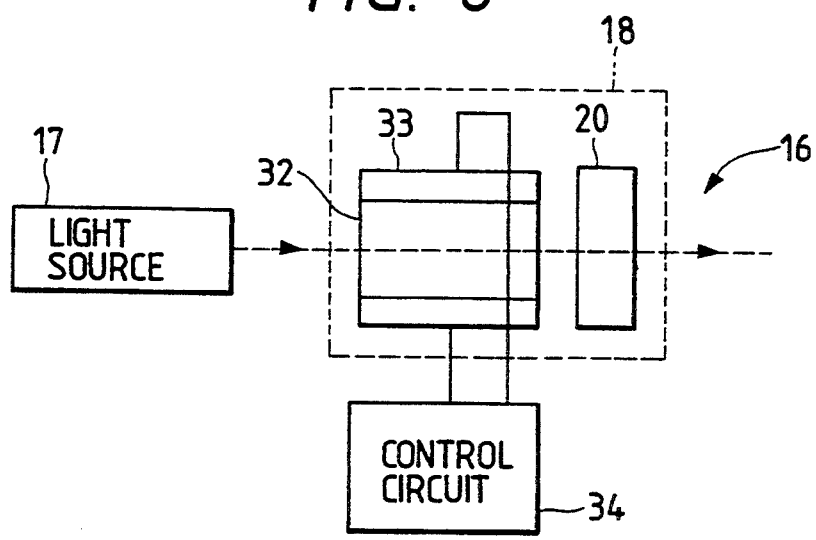

Referring now to FIG. 5, the arrangement of the light source system 16 is explained. In this figure, the light source system 16 includes a light source 17 emitting coherent light and a variable polarization element 18. Within the variable polarization element 18 are disposed a controllable-rotation half-wave plate 19 on which the coherent light from the light source is incident, and a quarter-wave plate 20 fixed behind the half-wave plate 19. The half-wave plate 19 is retained by a holder 21, which is connected to a gear 22. The gear 22 is coupled with a motor 24 through a pinion 23 meshing with the gear 22 so that the rotation of the half-wave plate 19 is controlled by the motor 24 driven through a rotation control circuit 25. The angle of rotation of the half-wave plate 19 is detected by an angle sensor 26 connected to the shaft of the motor.

Figure 1:
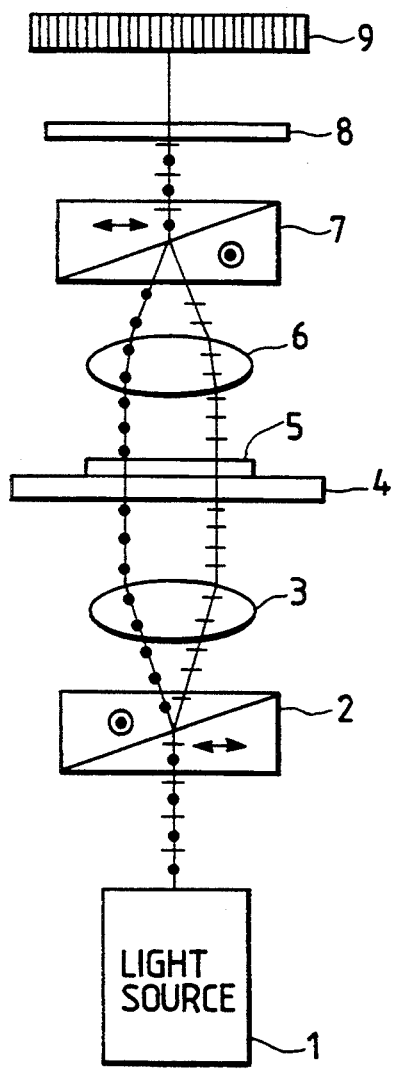
FIG. 1 is a view showing the arrangement of a conventional differential interference microscope.

The differential interference microscope shown in FIG. 3 is constructed so that the state of polarization of light emitted from the light source system 16 can be changed by a polarization control device 28 electrically connected to (the rotation control circuit 25 of) the light source system 16. The arrangement of the optical system subsequent to the light source system 16 is identical with that of the differential interference microscope shown in FIG. 1. Specifically, the optical system is provided with the Wollaston prism 2 whose orientation is adjusted so that the x and y polarized components are developed, the condenser lens 3, the sample 5 placed on the slide glass 4, the objective 6, the Wollaston prism 7, the polarizing plate 8, and the CCD 9. In the first embodiment, the Wollaston prism 7 is designed so as not to move in a lateral direction. The polarizing plate 8 is disposed so that its transmission axis is oriented at a predetermined angle with respect to the x and y polarized components. Here, the predetermined angle represents the orientation of the transmission axis such that the contrast of the interference image obtained from the CCD 9 becomes high, and if the x and y polarized components have the same intensity, the angle will be nearly 45°. The interference image picked up by the CCD 9 is brought into a frame memory 29. Subsequently, a computer 30 connected to the frame memory 29 and the polarization control device 28 performs calculations based on the interference image input from the frame memory 29 to bring about the information of phase distribution of the sample 5.

The first embodiment is constructed as mentioned above, and now, reference is made to its function. In the light source system 16, the coherent light emitted from the light source 17 is transmitted through the half-wave plate 19 within the variable polarization element 18 (refer to FIG. 5). In this case, the direction of vibration of the light varies with the orientation of the half-wave plate 19 whose rotation is controlled. The light, upon entering the quarter-wave plate 20, changes to the linearly polarized light or the elliptically polarized light depending on the direction of its vibration. This, as mentioned above, is attributable to the change of the phase difference between the x and y polarized components vibrating at right angles to each other. Here, when the angle of rotation of the half-wave plate 19 is denoted by $\theta$, the phase difference between the x and y polarized components emerging from the quarter-wave plate 20 changes by $4\theta$. Hence, while the orientation of the half-wave plate 19 is detected by the angle sensor 26, the half-wave plate 19 is rotated through the rotation control circuit 25 by the computer 30 until the predetermined angle is reached.

When the light thus emitted in a required state of polarization from the light source system 16 is incident on the Wollaston prism 2 as in the conventional differential interference microscope, it is broken up into the x and y polarized components vibrating perpendicular to each other. These components enter the sample 5 through the condenser lens 3, and after being transmitted by the sample 5, are recombined through the objective 6 by the Wollaston prism 7. Finally, the two polarized components interfere on the CCD 9 through the polarizing plate 8 disposed so that its transmission axis is oriented at the predetermined angle such that the contrast of the interference image becomes high with respect to the x and y polarized components. The user can observe the interference image picked up by the CCD 9, for instance, through a monitor.

If the state of polarization of light emitted from the light source system 16 is changed by the polarization control device 28, the phase difference between the x and y polarized components will change, and the contrast of the image of the sample 5 being observed will also change. The user can thus adjust the contrast so that the image is best visible.

In the present invention, since the phase difference between two interfering components of light can be changed with high accuracy, a fringe scanning technique used in an interferometer or the like can be applied to the observation with the interference microscope. Making use of the fringe scanning technique, the phase distribution of the sample 5 can be found quantitatively. Although, for example, a technique termed a phase shift is applied to lithographies of semiconductor memories, the phase distribution of the phase film used here has a significant effect on the accuracy of its pattern. According to the present invention, it is possible to measure quantitatively the phase distribution of the phase film.

Next, a description is given of its specific measuring method. The state of polarization of light emitted from the light source system 16 is first set to a particular phase difference between the x and y polarized components. Under this condition, the image obtained from the CCD 9 is brought into the frame memory 29, and this image is termed a first interference image. The state of polarization of light emitted from the light source system 16 is then changed by the polarization control device 28 so that the phase difference between the x and y polarized components shifts by 90° compared with that of the first interference image. Thus, the interference image brought about by the CCD 9 undergoes a change in contrast. This image is brought into the frame memory 29 and termed a second interference image. In this way, the phase difference between the x and y polarized components is made to shift in 90° steps so that third and fourth interference images are derived.

Next, using the algorithm of the fringe scanning technique, the phase distribution of the sample 5 is calculated from these four interference images. When the light-receiving surface of the CCD 9 is taken as an x-y coordinate plane, an interference intensity distribution In (x,y) for four patterns is expressed by $$I_1(x,y,d)=A(x,y)+B(x,y) \cos[(2\pi/\lambda)\omega(x,y)]$$
$$I_2(x,y,d)=A(x,y)-B(x,y) \sin[(2\pi/\lambda)\omega(x,y)]$$
$$I_3(x,y,d)=A(x,y)-B(x,y) \cos[(2\pi/\lambda)\omega(x,y)]$$
$$I_4(x,y,d)=A(x,y)+B(x,y) \sin[(2\pi/\lambda)\omega(x,y)] \quad (1)$$

Here, $A(x,y)$ is the average intensity of light, $B(x,y)$ the intensity of interference, $\lambda$ the wavelength, and $\omega(x,y)$ the phase difference of interference light, which in the case of the differential interference microscope, represents the differentiation of the phase distribution of the sample 5. Based on these images, the computer 30 performs the calculation of the equation $$\omega(x,y)=(\lambda/2\pi) \tan^{-1}[(I_4-I_2)/(I_1-I_3)] \quad (2)$$

for every pixel of the CCD 9, and thereby only the information of the phase distribution $\omega$ can be obtained. Further, if the phase distribution $\omega$ is integrated with respect to a separation width between the x and y polarized components, the phase distribution of the sample 5 can be found. Although in this instance four pattern images are used, the images are not necessarily limited to four patterns. The use of at least three pattern images makes it possible to obtain the information of the phase distribution.

According to the present invention, as mentioned above, in the differential interference microscope, the contrast can be set in such a manner that the Wollaston prism 7 is not moved in a lateral direction and the variable polarization element 18 has no effect on the imaging relationship. The light source system 16, because it is provided with the polarization control means, can be applied to various differential interference microscopes if the light source system 16 has an unloading function.

Moreover, by connecting the frame memory 29 and the computer 30, the phase distribution of the sample can be measured quantitatively.

With reference to FIGS. 6 to 12, other arrangements of the light source system 16 will be explained below. In the light source system 16 depicted In FIG. 6, a Faraday element 32, in place of the half-wave plate 19, is disposed so that its optical rotatory power changes the direction of vibration of linearly polarized light incident from the light source 17. An electromagnetic field generator 33 provided on the periphery of the Faraday element 32 is connected to an electromagnetic control circuit 34, through which the intensity of the electromagnetic field produced by the electromagnetic field generator 33 is adjusted, thus enabling the direction of vibration of the polarized light to be controlled.

Figure 7:
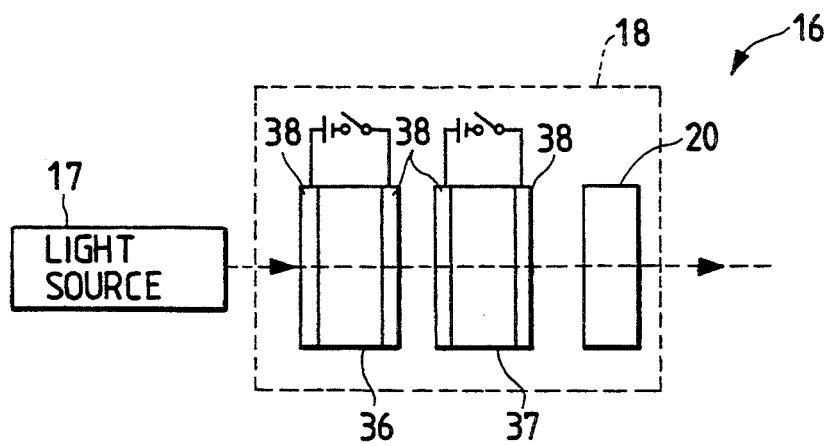

For the light source system 16 shown in FIG. 7, a pair of optically active liquid crystals 36, 37 are disposed in place of the half-wave plate 19. A liquid crystal 36 situated on the side of the light source 17 is such that the direction of vibration of the polarized light can be changed by 90°, while a liquid crystal 37 on the side of the quarter-wave plate 20 is such that the direction of vibration can be changed by 45°. A combination of the liquid crystals 36 and 37 makes it possible to change the direction of vibration of incident linearly polarized light to 0°, 45°, 90°, and 135° by performing the on-off control of conduction to transparent electrodes 38 provided on both sides of each liquid crystal.

Figure 8:
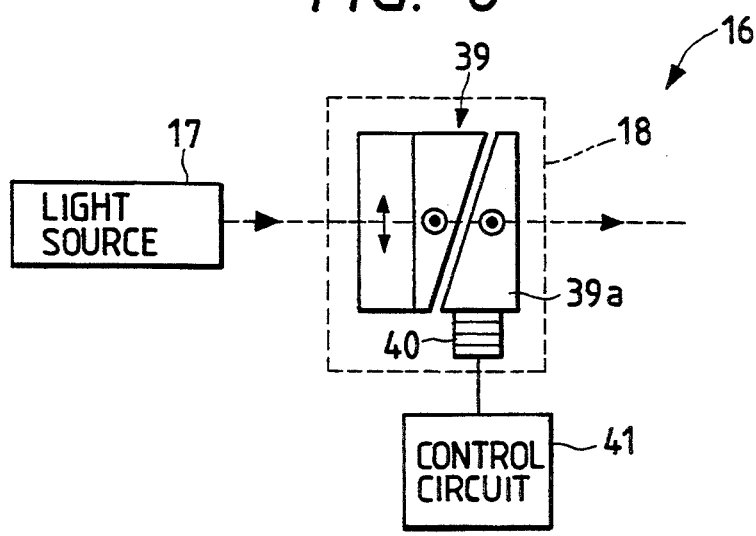

As for the light source system 16 shown in FIG. 8, a Babinet-Soleil compensator 39 is used as the variable polarization element 18, and one wedge-shaped crystal of the Babinet-Soleil compensator 39 is moved perpendicular to the optical axis, thereby directly changing the phase difference between the x and y polarized components. The construction In FIG. 8 is such that the position of one wedge-shaped crystal 39a is shifted by means of a piezoelectric element 40, which is connected to and driven by a voltage control circuit 41.

Figure 9:
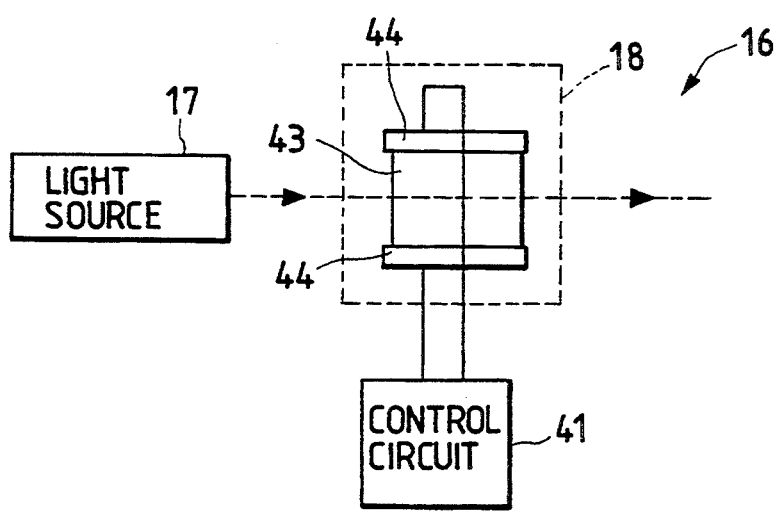

The light source system 16 depicted in FIG. 9 is constructed so that a crystal 43, such as KDP, possessing an electrooptical effect is used as the variable polarization element 18, and the phase difference varies with the refractive Index. The crystal 43 is sandwiched between electrodes 44 forming a pair, and the voltage control circuit 41 controls the field intensity applied to the crystal 43.

Figure 10:
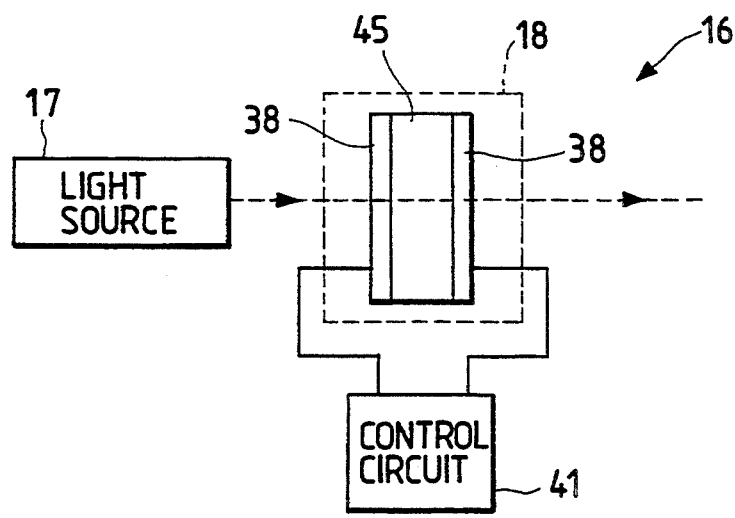

In the light source system 16 illustrated in FIG. 10, a nematic liquid crystal 45 is used as the variable polarization element 18. By varying the field intensity applied to the nematic liquid crystal 45 through the electrodes 38, the orientation of the nematic liquid crystal 45 and the refractive index are changed.

Figure 11:
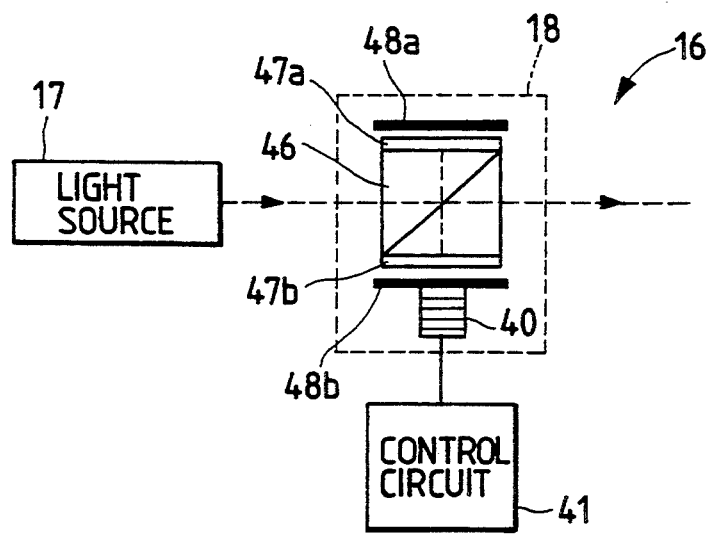

In the variable polarization element 18 of the light source system 16 shown in FIG. 11, a polarization beam splitter 46 is disposed on the optical axis. A quarter-wave plate 47a and a mirror 48a are arranged on one side of the polarization beam splitter 46 with respect to the optical axis, while a quarter-wave plate 47b, a mirror 48b, and the piezoelectric element 40 on the other side. Consequently, of light emitted from the light source 17, a P wave is transmitted by the polarization beam splitter 46, but the an S wave is reflected therefrom. The S wave passes through the quarter-wave plate 47a, is reflected from the mirror 48a, and passes through again the quarter-wave plate 47a, thus being transformed into the P wave. This reflected light, after transmission through the polarization beam splitter 46, travels likewise through the quarter-wave plate 47b, is reflected from the mirror 48b, travels again through the quarter-wave plate 47b to come to the S wave, and is reflected and emerges from the polarization beam splitter 46.

On the back surface of the mirror 48b is fixedly cemented the piezoelectric element 40, which causes the mirror 48a to be moved perpendicular to the optical axis through the voltage control circuit 41. Thus, the phase difference between the P and S waves can be varied.

Figure 12:
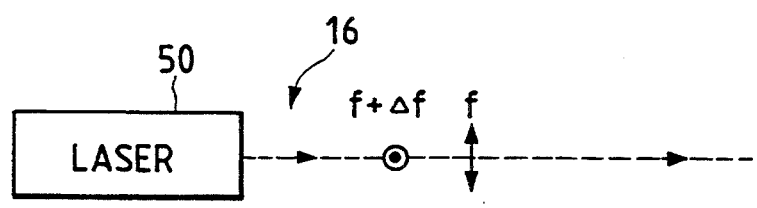

The light source system 16 shown in FIG. 12 is such that a Zeeman laser 50 is employed as the light source to change the phase difference. The Zeeman laser 50 emits linearly polarized light different in frequency and vibrating perpendicular to each other. Specifically, the polarized light is emitted as the x and y polarized components between which the phase difference varied with time, and a timing pulse is produced from an oscillator housed in the Zeeman laser 50 to fetch an image on the basis of the pulse.

In the first embodiment, as shown in the examples of various arrangements mentioned above, an optical element for changing the phase difference is disposed on the optical axis common to two interfering components of light. Hence, the first embodiment has the advantage of lessening the influence of a disturbance attributable to thermal change and vibration.

Figure 13:
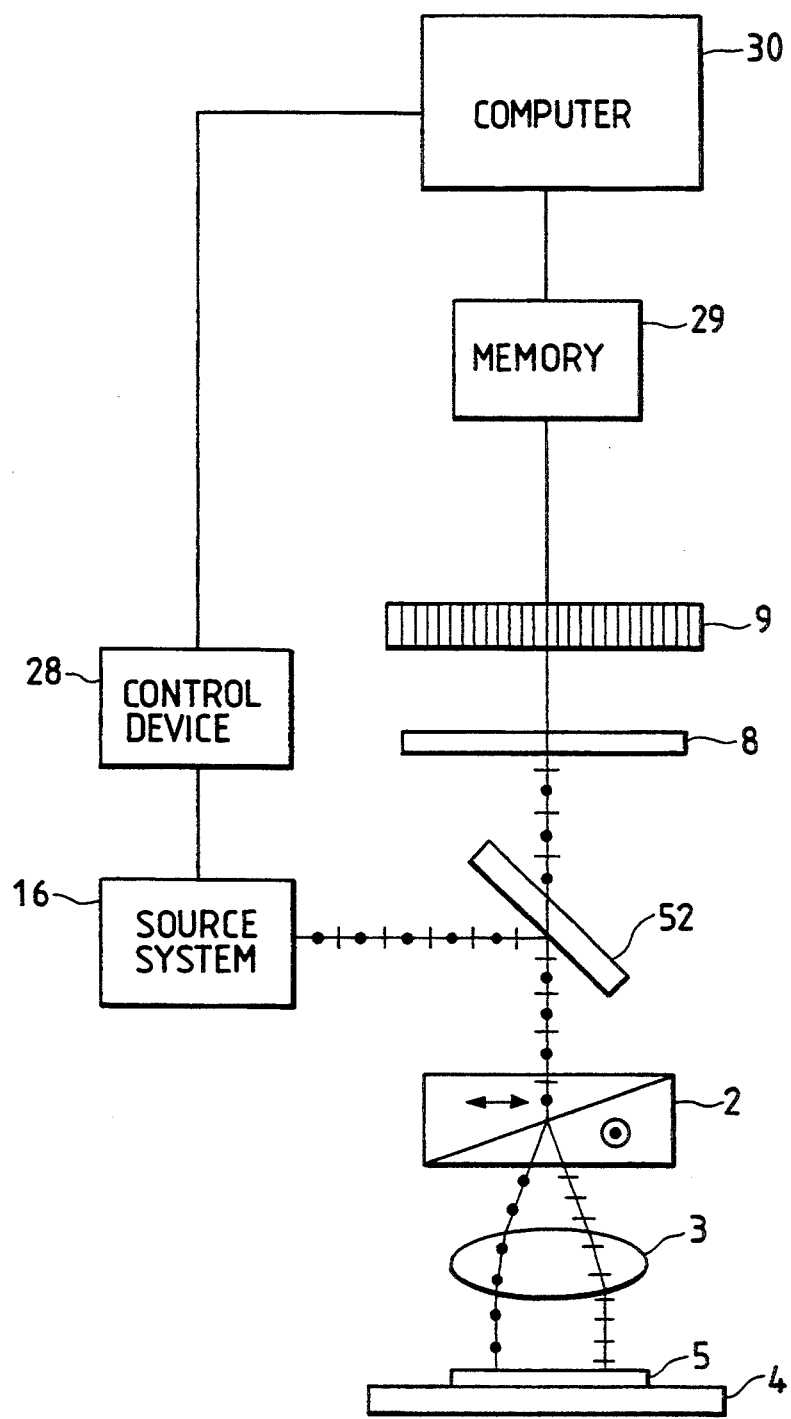
FIG. 13 is a view showing the arrangement of the differential interference microscope which is a second embodiment of the present invention.

Next, based on FIG. 13, reference is made to a second embodiment of the present invention. This embodiment is directed to a reflection type differential interference microscope. Light emitted from the light source system 16, constructed identical with that of the first embodiment, is partially reflected by a half mirror 52, enters the Wollaston prism 2 to be broken up into the x polarized component and the y polarized component, and irradiates the sample 5 through the condenser lens 3. The light reflected from the sample 5 enters again the Wollaston prism 2 for recombination, and after transmission through the half mirror 52, interferes on the CCD 9 through the polarizing plate 8. The function of the second embodiment subsequent to this is the same as in the first embodiment. That is, the state of polarization of the light from the light source system 16 can be changed by the polarization control device 28, and thus the contrast of the interference image can be adjusted. Also, the interference image of different pattern makes it possible to measure a surface profile through the computer 30. The arrangement of the second embodiment has the advantage of reducing the number of optical elements because the Wollaston prism 2 is also used as the wave separating and recombining means.

Figure 14:
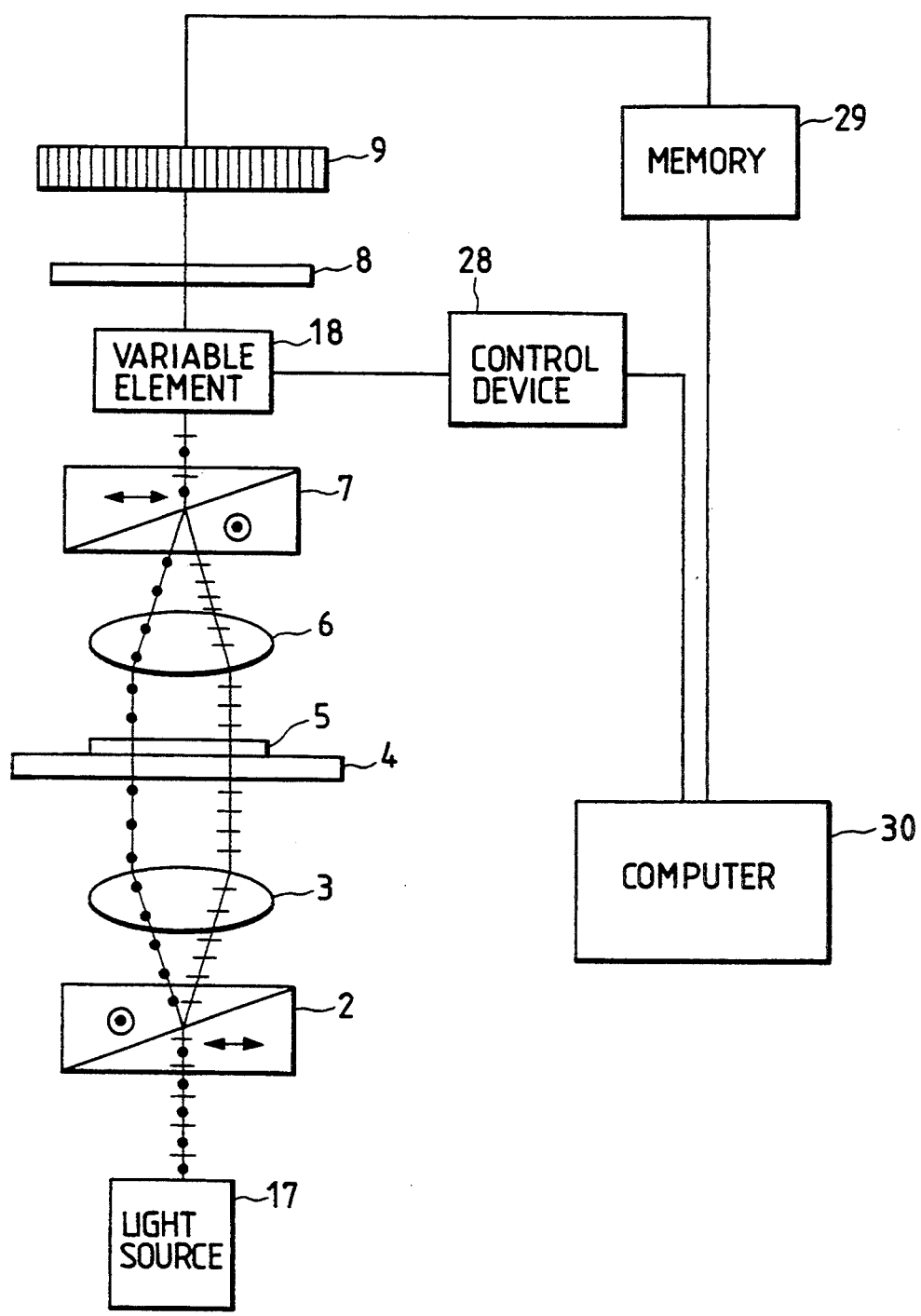
FIG. 14 is a view showing the arrangement of the differential interference microscope which is a third embodiment of the present invention.

FIG. 14 shows a third embodiment of the present invention. In this embodiment, the variable polarization element 18 constituting the light source system 16 shown in FIGS. 5 to 11 is interposed between the Wollaston prism 7 and the polarizing plate 8. This arrangement is made so that coherent light emitted from the light source 17 is equally divided into the x and y polarized components, which after transmission through the sample 5, are recombined by the Wollaston prism 7, and the phase difference between the x and y polarized components is changed by the variable polarization element 18. The optimal interference image can thus be derived from the CCD 9. Further, by performing the calculation similar to the case of the first embodiment, the phase distribution of the sample 5 can be found.

Figure 15:
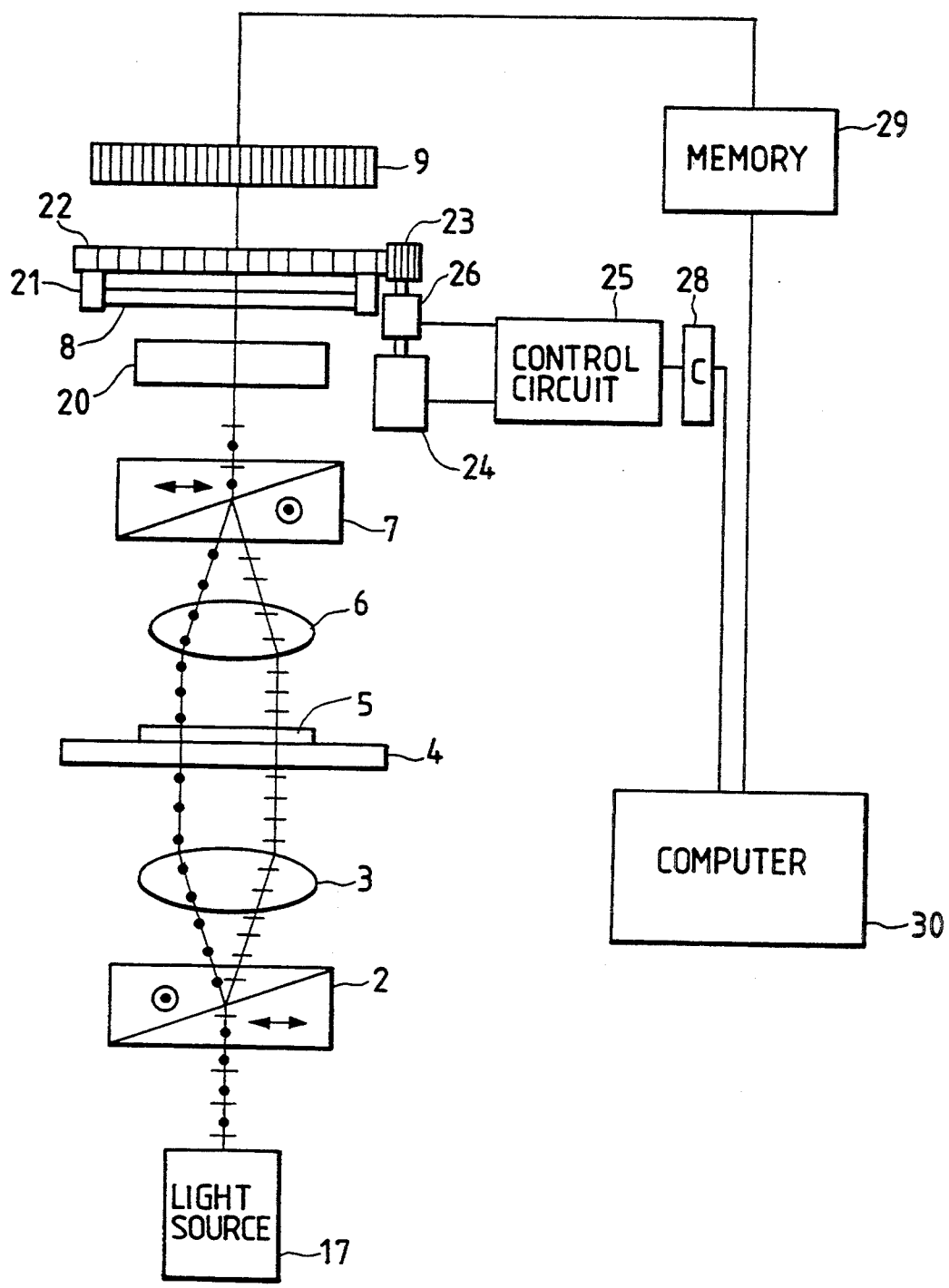
FIG. 15 is a view showing the arrangement of the differential interference microscope which is a fourth embodiment of the present invention.

Referring to FIG. 15, a fourth embodiment of the present invention is explained. In this embodiment, the light source 17 is disposed in front of the Wollaston prism 2. The polarizing plate 8 is provided to be rotatable, and the quarter-wave plate 20 is disposed between the polarizing plate 8 and the Wollaston prism 7. The rotating means of the polarizing plate 8 is similar to that of the half-wave plate 19 of the first embodiment. That is, the gears 22 and 23 and the motor 24 are connected to the holder 21 carrying the polarizing plate 8, and the rotation control circuit 25 and the angle sensor 26 are also connected. The x and y polarized components incident on the quarter-wave plate 20 are converted, by the quarter-wave plate 20, into circularly polarized components which rotate in opposite directions, and the phase difference between the components will vary with the orientation of the transmission axis of the polarizing plate 8. Specifically, when the transmission axis changes by 45°, the phase difference changes by 90°. Thus, in the measurement of the phase distribution, when the polarizing plate 8 is rotated through 0°, 45°, 90°, and 135° with respect to a certain angle, the interference images can be obtained as patterns whose phase differences increase in 90° steps. The fourth embodiment makes the number of optical elements smaller than in the first embodiment using the variable polarization element 18 shown in FIG. 5, and therefore has the advantage of simplifying the process of adjustment of the transmission axis.

Figure 16:
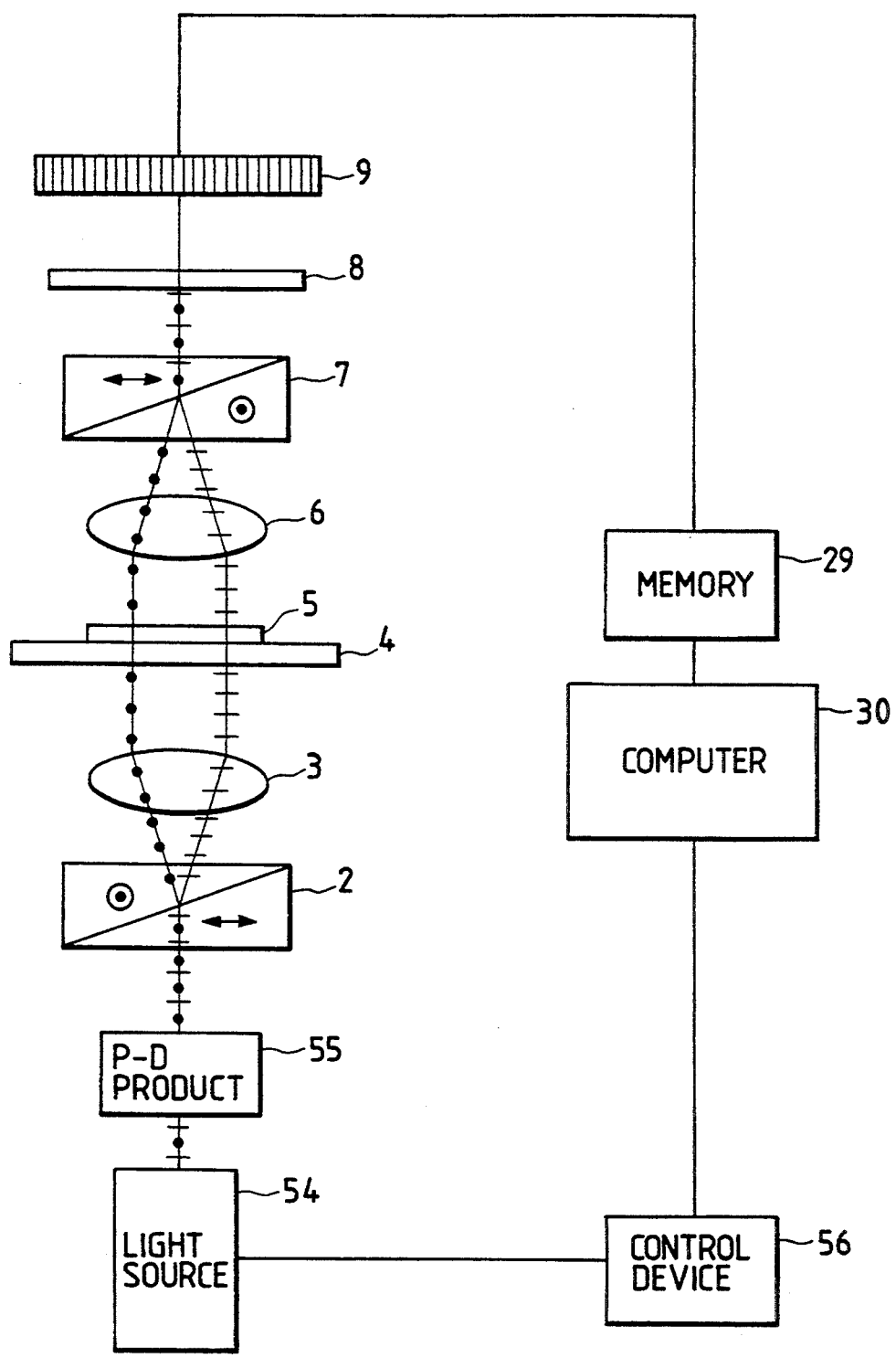
FIG. 16 is a view showing the arrangement of the differential interference microscope which is a fifth embodiment of the present invention.

FIG. 16 shows a fifth embodiment of the present invention. This embodiment is equipped with a variable wavelength light source 54, instead of the light source system 16, capable of changing the wavelength of the polarized light to be emitted and a path-difference producing section 55 for providing the polarized components having the directions of vibrations perpendicular to each other with different optical path lengths, in relation to the polarized light emitted from the light source 54. These polarized components perpendicular to each other are referred to as the x polarized component and the y polarized component. The variable wavelength light source 54 is connected to a wavelength control device 56, by which the wavelength of the polarized light from the variable wavelength light source 54 can be changed.

Figure 17:
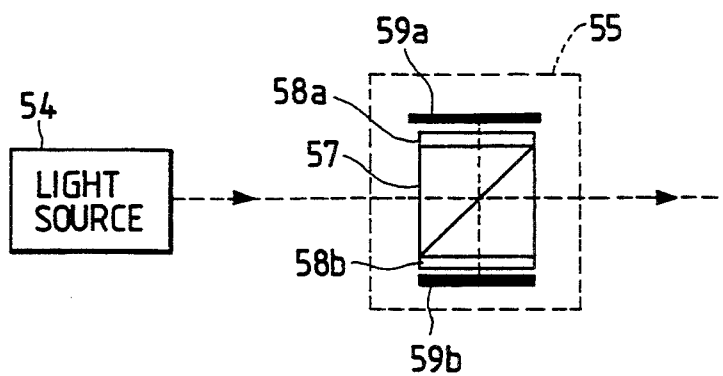
FIGS. 17 to 20 are views showing examples of various arrangements of a variable wavelength light source and a path-difference producing section in the fifth embodiment.

Referring now to FIG. 17, an example of the arrangement of the path-difference producing section 55 is explained. In this figure, a polarization beam splitter 57 is disposed on the optical axis, and quarter-wave plates 58a and 58b and mirrors 59a and 59b are arranged on both sides of the polarization beam splitter 57 with respect to the optical axis. Consequently, of the light emitted from the variable wavelength light source 54, the P wave is transmitted by the polarization beam splitter 57, but the S wave is reflected therefrom. The S wave passes through the quarter-wave plate 58a, is reflected from the mirror 59a, and passes again through the quarter-wave plate 58a, thus being transformed into the P wave. This reflected light, after transmission through the polarization beam splitter 57, travels likewise through the quarter-wave plate 58b, is reflected from the mirror 59b, travels again through the quarter-wave plate 58b to come to the S wave, and is reflected and emerges from the polarization beam splitter 57. In this way, the optical path difference will arise between the P and S waves at the path-difference producing section 55, corresponding to twice the length of the optical path of the polarization beam splitter 57 along which light goes and returns. The P and S waves are used as the x and y polarized components, respectively.

The polarized light having passed through the path-difference producing section 55 now undergoes a change in phases of the x and y polarized components, which are incident on the Wollaston prism 2 as in the above embodiments.

In the fifth embodiment, when the wavelength of the polarized light is changed which is emitted from the variable wavelength light source 54 by the wavelength control device 56, the phase difference made by the path-difference producing section 55 is also changed. An amount of change $\Delta\theta$ of the phase difference is given by $$\Delta\theta = 2\pi\Delta\lambda d/\lambda^2 \qquad (3)$$

where $\Delta\lambda$ is the amount of wavelength shift and d is the optical path difference. Thus, in order to turn the amount of change $\Delta\theta$ into $2\pi$, the wavelength may be changed by the amount of wavelength shift $\Delta\lambda$ expressed by $$\Delta\lambda = \lambda^2/d \qquad (4)$$

Hence, by changing linearly or stepwise the wavelength so that the phase difference between the x and y polarized components varies every 90°, the interference images different in contrast from one another can be obtained. The processing way in the measurement of phase distribution is the same as in the above embodiments.

As seen from Eq. (4), the larger the optical path difference d caused by the path-difference producing section 55, the greater the change of contrast with a small amount of wavelength shift $\Delta\lambda$. For a larger amount of wavelength shift $\Delta\lambda$, errors and the amount of phase change $\Delta\theta$ come to nonlinearity under the influence of chromatic dispersion, and larger errors are produced in measuring the phase distribution. The path-difference producing section 55 is used to solve such problems. If the problems are not caused, the path-difference producing section 55 may be removed. The variable wavelength light source 54 can be replaced with a semiconductor laser, a dye laser, or an F-center laser. A way of combining a white light source with a variable wavelength filter may also be adopted. The semiconductor laser permits the wavelength to be easily changed in particular by increasing or decreasing the current flowing thereinto.

The fifth embodiment, as mentioned above, has advantages that because mechanically moving parts are not contained, vibration attributable to the drive of the moving parts is not generated, and excellent stability is assured. Although in this embodiment the light source is constructed to possess a variable wavelength function as the variable wavelength light source 54, a white light source, instead thereof, may be used in such a way that a variable wavelength means, such as a filter, is situated in front of the light source to vary the wavelength.

Figure 18:
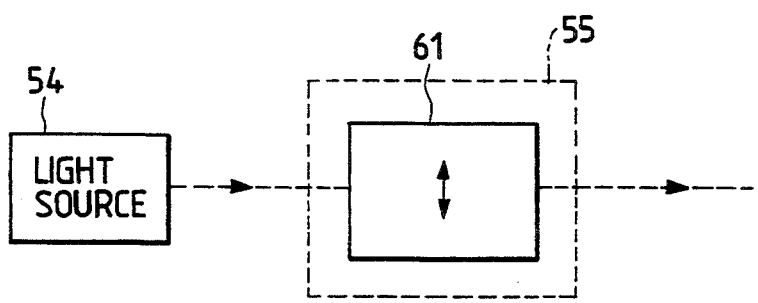
Figure 19:
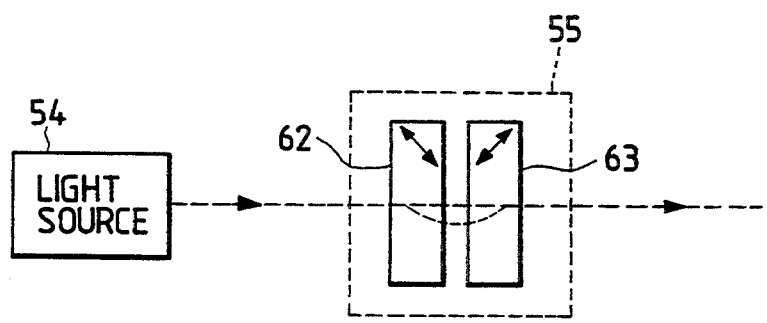
Figure 20:
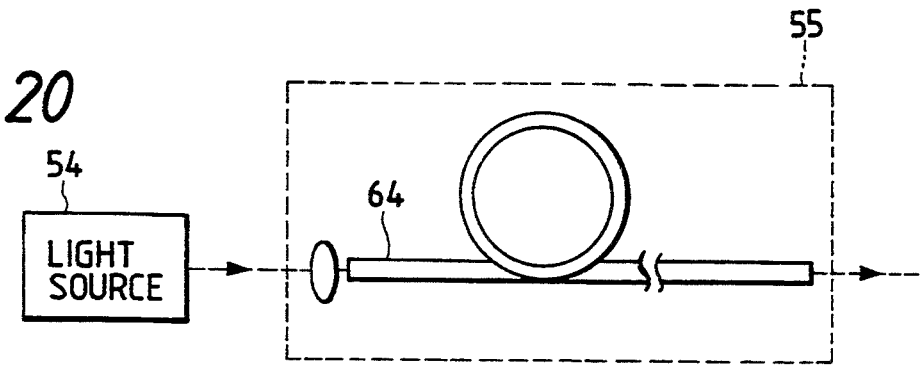

Next, in accordance with FIGS. 18 to 20, reference is made to other examples of the path-difference producing section 55. The path-difference producing section 55 shown in FIG. 18 includes a birefringent element 61. If the orientation of the birefringent element 61 is represented by the x axis and the y axis, and the direction of vibration of the linearly polarized light emitted from the variable wavelength light source 54 is inclined at 45° to make the light incident, the optical path difference can be set between the x and y polarized components by the propagation of the light to the birefringent element 61. The birefringent element 61 is available as a crystal, such as quartz, calcite, rutile, etc.

The producing section 55 shown in FIG. 19 is composed of two polarizing prisms 62 and 63. The crystal axes of the polarizing prisms 62 and 63, as indicated by arrows in the figure, are oriented at an angle of 45° with the optical axis in opposite directions, making right angles with each other. Thus, one polarized component perpendicular to the plane of the figure comes to ordinary light, while the other polarized component parallel thereto comes to extraordinary light, with the result that one optical axis is laterally deviated by the first polarizing prism 62. The one optical axis coincides again with the other optical axis by the second polarizing prism 63. The two polarizing prisms 62 and 63 thus provide the optical path difference between the ordinary and extraordinary light.

The producing section 55 shown in FIG. 20 is composed of a polarization preserving optical fiber 64. In general, the optical fiber 64 possesses birefringent properties and may be regarded as equivalent to the example shown in FIG. 18. In this arrangement, however, the optical fiber 64 also functions as a light-transmitting means and as such is effective when the light source 54 is placed at a great distance away from the sample 5.

Figure 21:
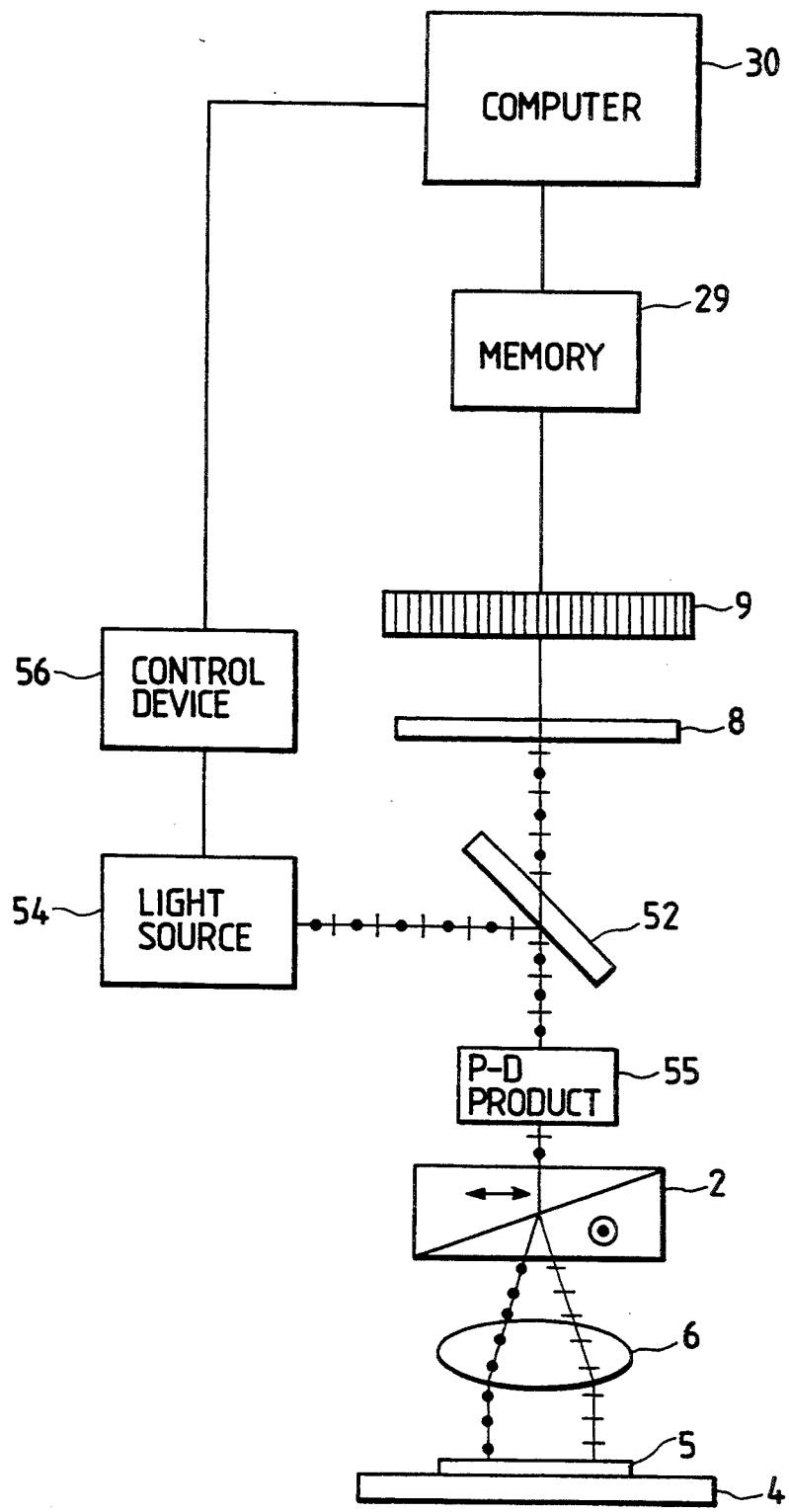
FIG. 21 is a view showing the arrangement of the differential interference microscope which is a sixth embodiment of the present invention.

Based on FIG. 21, a sixth embodiment of the present invention is described. In this embodiment, the present invention is applied to the reflection type differential interference microscope as in the second embodiment. The path-difference producing section 55 is disposed between the half mirror 52 and the Wollaston prism 2. The light from the variable wavelength light source 54 is reflected by the half mirror 52 and transmitted through the path-difference producing section 55, so that the optical path difference is caused between the x and y polarized components. These polarized components are incident on the Wollaston prism 2 where their optical axes are separated, and irradiate the sample 5. The light reflected therefrom is incident again on the Wollaston prism 2, and after recombination, is transmitted again through the producing section 55. In the case of the sixth embodiment, two interfering components traverse the producing section 55 twice, so that the optical path difference is doubled. Thus, there is the advantage of reducing the amount of wavelength shift accordingly. The producing section 55 may be disposed at any position on the optical path from the light source 54 to the polarizing plate 8. In order to double the optical path difference, however, it is necessary to dispose the producing section 55 between the sample 5 and the half mirror 52.

Figure 2:
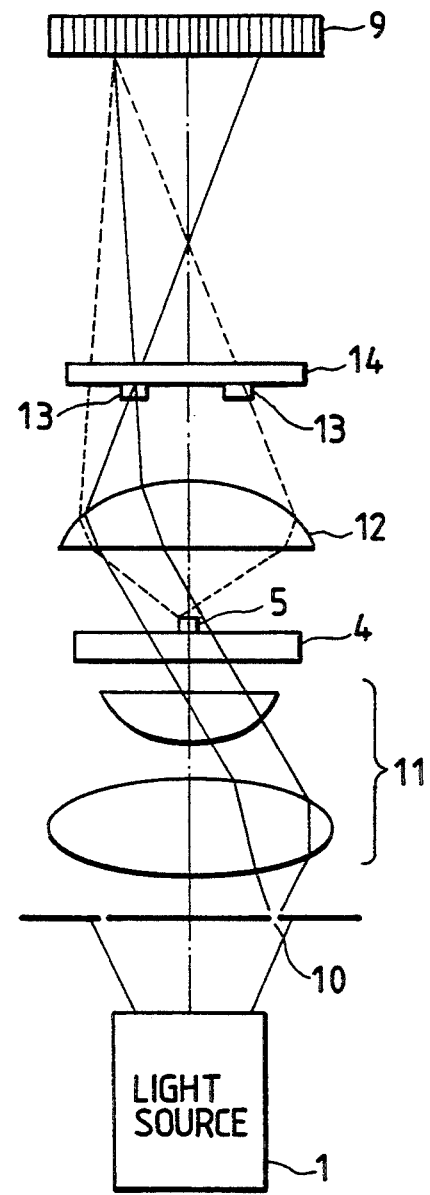
FIG. 2 is a view showing the arrangement of a conventional phase-contrast microscope.
Figure 22:
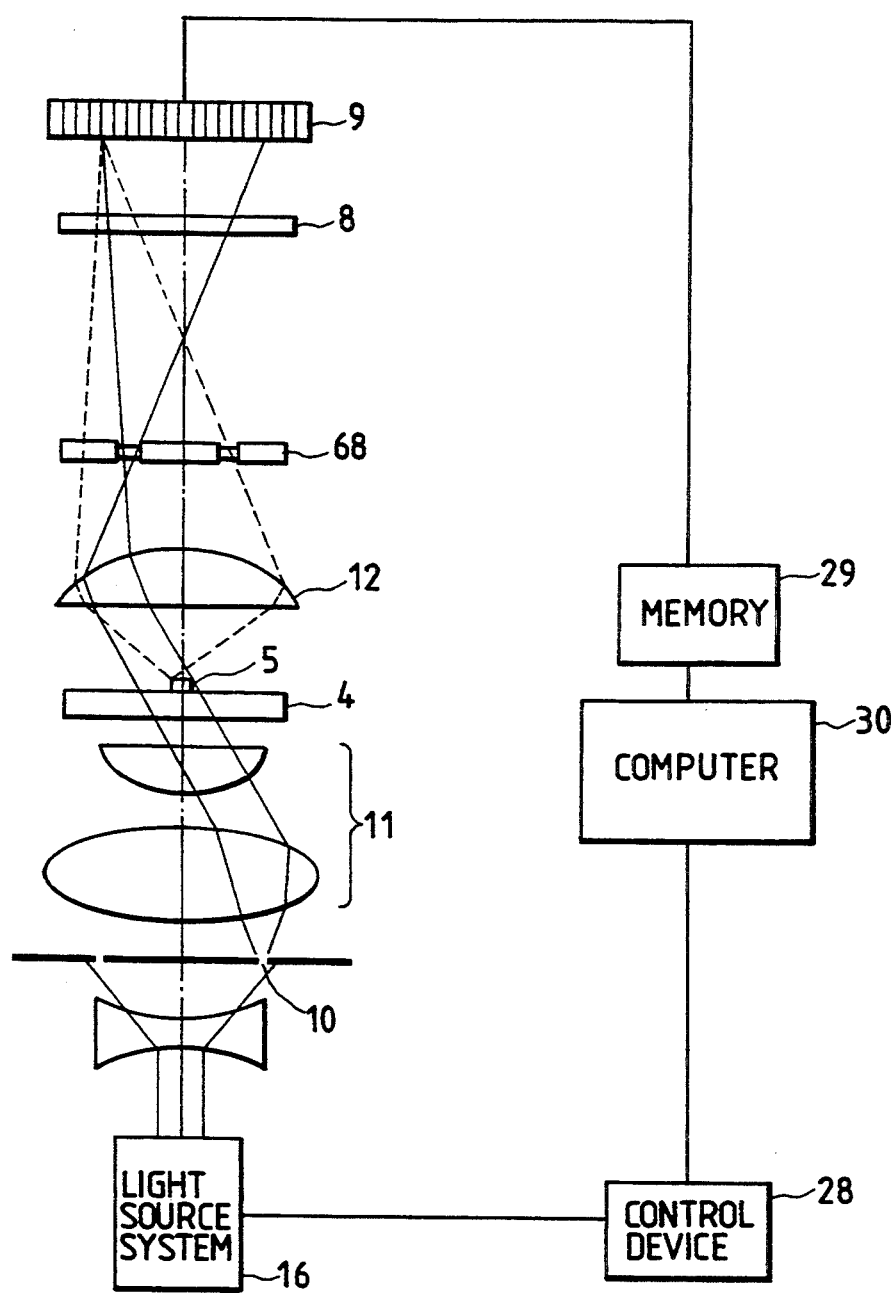
FIG. 22 is a view showing the arrangement of a phase-contrast microscope which is a seventh embodiment of the present invention.
Figure 23A:
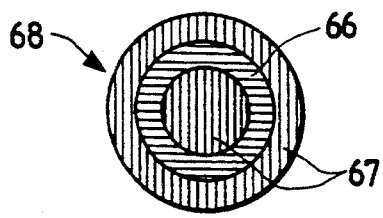
FIGS. 23A and 23B are plan views showing a compound polarizing plate and a polarizing plate, respectively, in the seventh embodiment.
Figure 23B:
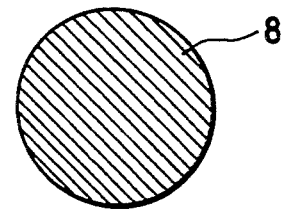

Next, reference is made to the embodiments in which the present invention is applied to the phase-contrast microscope. FIG. 22 shows the arrangement of the phase-contrast microscope which is a seventh embodiment of the present invention. For the light source, the light source system 16 is provided similar to the first embodiment. Behind it, as in the prior art of FIG. 2, the annular opening 10 followed by the condenser lens 11 is disposed, and the light is divided into the transmitted component and the diffracted component by irradiating the sample 5. Subsequently, a compound polarizing plate 68, for example, of a circular shape, is disposed which includes two polarizing plates 66 and 67 whose polarizing axes are different at right angles to each other. One polarizing plate 66 is shaped into a doughnut-like form, while the other polarizing plate 67 into annular and circular forms which occupy the areas on both sides of the plate 66 (refer to FIG. 23A). The transmission axis of the doughnut-like polarizing plate 66 is taken as the x axis and that of the other polarizing plate 67 as the y axis perpendicular to the x axis. The optical system is constructed so that the transmitted component of the sample 5 is incident on the polarizing plate 66, while the diffracted component enters the other polarizing plate 67. Hence, for the transmitted component of the sample 5, only the x polarized component will be transmitted by the polarizing plate 66, while for the diffracted component, only the y polarized component will be transmitted by the polarizing plate 67. The polarizing plate 8 situated between the compound polarizing plate 68 and the CCD 9 has a transmission axis oriented by 45° with respect to the x and y axes of the compound polarizing plate 68 (refer to FIG. 23B). Thus, the transmitted and diffracted components interfere on the CCD 9.

In order to set the optimum image on the CCD 9, it is only necessary, as in the first embodiment, to alter the state of polarization of light emitted from the light source system 16 through the polarization control device 28. In the case of the measurement of phase distribution, a plurality of interference images different in contrast is brought into the memory frame 29, and the calculation of Eq. (2) is performed by the computer 30. The result thus available, in the phase-contrast microscope, is the Fourier transform of the phase distribution of the sample 5 and as such, by an inverse Fourier transform, the phase distribution of the sample 5 can be found quantitatively. Although the seventh embodiment gives the case where the transmission axes of the two polarizing plates 66 and 67 constituting the compound polarizing plate 68 are perpendicular to each other, they need not necessarily be perpendicular depending on the variation of the state of polarization. Further, the orientation of the polarizing plate 8 subsequent to the compound polarizing plate 68 need not necessarily be 45° depending on the value of the difference in intensity between the transmitted and diffracted components. The light source system 16 permits the use of the same one as shown in FIGS. 5 to 12. The variable polarization element 18 contained in the light source system 16 may, independently of the light source 17, be anywhere inserted and located in the optical path from the light source 17 to the polarizing plate 8. Alternatively, similar to the fourth embodiment stated, the arrangement may be such that, instead of using the variable polarization element 18, the polarizing plate 8 is made rotatable and the quarter-wave plate 20 is inserted between the polarizing plate 8 and the compound polarizing plate 68.

Figure 24:
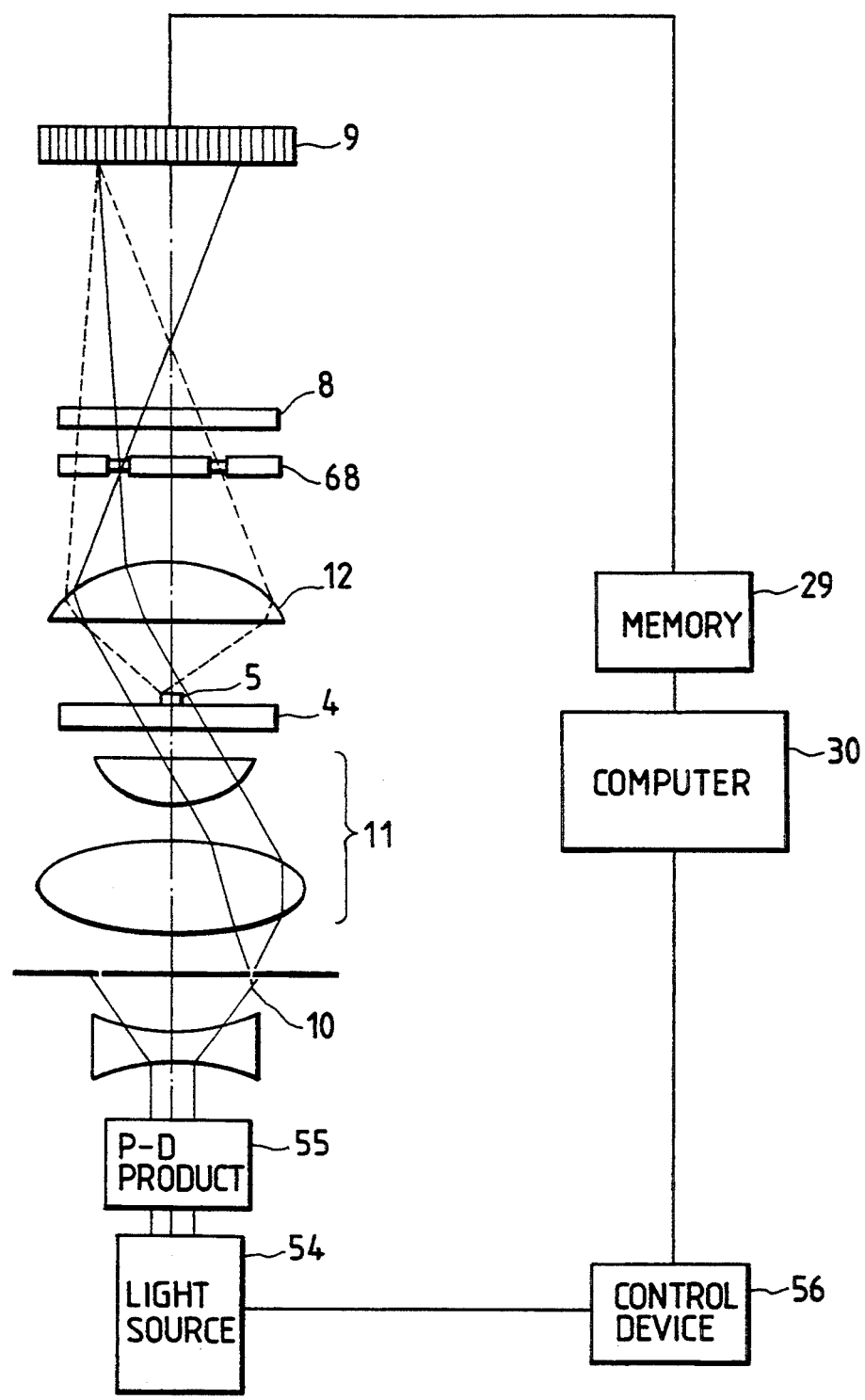
FIG. 24 is a view showing the arrangement of a phase-contract microscope which is an eighth embodiment of the present invention.

FIG. 24 depicts the arrangement of the phase-contrast microscope which is an eighth embodiment of the present invention. This embodiment, like the fifth embodiment, is equipped with the variable wavelength light source 54 and the path-difference producing section 55. The polarized light leaving the variable wavelength light source 54 is transmitted through the path-difference producing section 55 and split up into the transmitted component and the diffracted component at the sample 5. By passing through the compound polarizing plate 68, they come to the x and y polarized components, which interfere on the CCD 9 through the polarizing plate 8. In the eighth embodiment, the path-difference producing section 55 is adapted to provide the optical path difference between the x and y polarized components. The variation of the wavelength of the light from the light source 54 causes the change of the phase difference between the x and y polarized components, followed by the change of contrast. In this embodiment also, the producing section 55 may be inserted and disposed in any optical path from the light source 54 to the polarizing plate 8.

Figure 25:
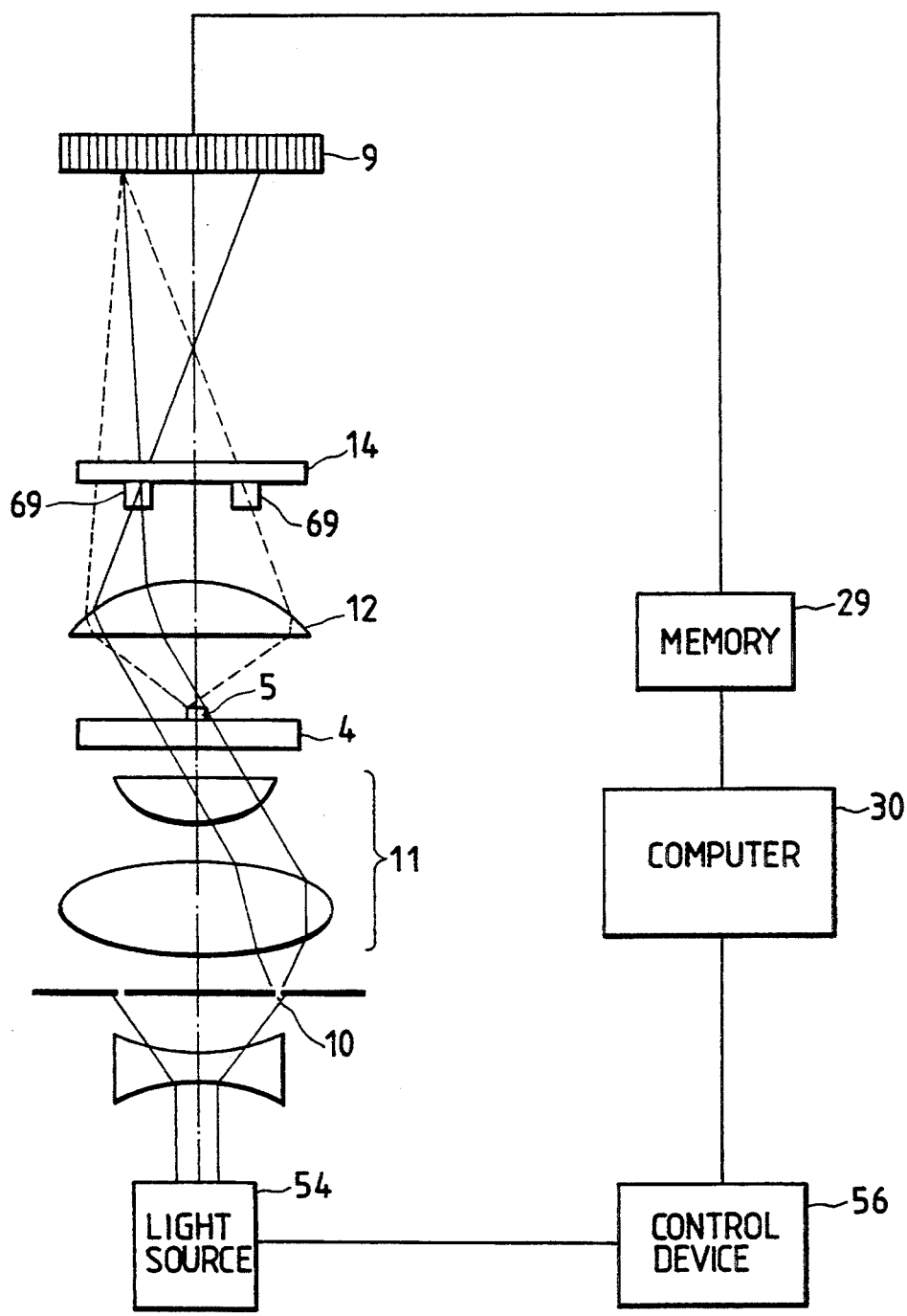
FIG. 25 is a view showing the arrangement of a phase-contrast microscope which is a ninth embodiment of the present invention.

Further, the path-difference producing section 55 is adapted to increase the optical path difference between the x and y polarized components. Hence, as in a ninth embodiment shown in FIG. 25, the thickness of a phase film 69 used in the conventional phase-contrast microscope is sufficiently increased, thereby allowing the setting of the optical path difference between the x and y polarized components. In this case, the producing section 55 Is not required as a matter of course.

What is claimed is:

1. A differential interference microscope comprising:
   a light source;
   splitting means for breaking up light emitted from said light source into two polarized components having directions of vibrations perpendicular to each other;
   recombining means for superposing said two polarized components emerging from a sample;
   a polarizing plate disposed so that a transmission axis of said polarizing plate is oriented at a predetermined angle with each of said directions of vibrations of said two polarized components;
   detecting means for detecting light transmitted through said polarizing plate; and
   variable polarization means disposed on an optical path between said light source and said detecting means, for changing a phase difference between said two polarized components in 90° steps to assume four possible states of polarization of light passing through said variable polarization means.

2. A differential interference microscope comprising:
   a light source emitting two linearly polarized components of light different in frequency from each other, said two linearly polarized components of light having directions of vibrations perpendicular to each other;
   splitting means for separating said two polarized components emitted from said light source;
   recombining means for superposing said two polarized components emerging from a sample;
   a polarizing plate disposed so that a transmission axis of said polarizing plate is oriented at a predetermined angle with each of said directions of vibrations of said two polarized components; and
   detecting means for detecting light transmitted through said polarizing plate.

3. A differential interference microscope comprising:
   a light source;
   splitting and recombining means for breaking up light emitted from said light source into two polarized components having directions of vibrations perpendicular to each other, and for superposing said two polarized components reflected from a sample;
   path splitting means disposed between said light source and said splitting and recombining means for dividing an optical path;
   a polarizing plate disposed in said optical path divided by said path splitting means disposed so that a transmission axis of said polarizing plate is oriented at a predetermined angle with each of said directions of vibrations of said two polarized components;
   detecting means for detecting light transmitted through said polarizing plate; and
   variable polarization means disposed on an optical path between said light source and said detecting means, for changing a phase difference between said two polarized components in 90° steps to assume four possible states of polarization of light passing through said variable polarization means.

4. A microscope according to any one of claims 1 or 3, wherein said variable polarization means includes:
   a half-wave plate disposed to be rotatable about an optical axis; and
   a quarter-wave plate.

5. A microscope according to any one of claims 1 or 3, wherein said variable polarization means includes:
   a Faraday rotator; and
   a quarter-wave plate.

6. A microscope according to any one of claims 1 or 3, wherein said variable polarization means includes:
   a first optically active liquid crystal for rotating a direction of vibration of incident light through 90°;
   a second optically active liquid crystal for rotating said direction of vibration of incident light through 45°; and
   a quarter-wave plate.

7. A microscope according to any one of claims 1 or 3, wherein said variable polarization means includes a Babinet-Soleil compensator.

8. A microscope according to any one of claims 1 or 3, wherein said variable polarization means includes a birefringent crystal possessing an electrooptical effect.

9. A microscope according to any one of claims 1 or 3, wherein said variable polarization means includes a nematic liquid crystal element.

10. A differential interference microscope comprising:
    a light source;
    splitting means for breaking up light emitted from said light source into two polarized components having directions of vibrations perpendicular to each other;
    recombining means for superposing said two polarized components emerging from a sample;
    detecting means for detecting said superposed components; and
    variable polarization means disposed on an optical path between said light source and said detecting means, for changing a phase difference between said two polarized components in 90° steps to assume four possible states of polarization of light passing through said variable polarization means.

11. A microscope according to any one of claims 1, 3, or 10, wherein said detecting means derives four output signals from detecting respectively light in respective ones of said four possible states of polarization, said microscope further comprising a computer to calculate a phase distribution of said sample from said four output signals, based on an equation $$\omega(x,y) = (\lambda/2\pi) \tan^{-}[(I_4 - I_2)/(I_1 - I_3)]$$

where $\omega$ is a phase distribution of the sample and $I_1$, $I_2$, $I_3$, and $I_4$ are said four output signals from said detecting means.

12. A differential interference microscope comprising:
- a light source whose emission light is variable in wavelength;
- splitting means for breaking up said variable wavelength light from said light source into two polarized components having directions of vibrations perpendicular to each other;
- recombining means for superposing said two polarized components emerging from a sample;
- a polarizing plate disposed so that a transmission axis of said polarizing plate is oriented at a predetermined angle with each of said directions of vibrations of said two polarized components; and
- detecting means for detecting light transmitted through said polarizing plate.

13. A microscope according to claim 12, further comprising path-difference producing means for providing said two polarized components with different optical path lengths, said path-difference producing means being disposed in an optical path between said light source and said detecting means.

14. A microscope according to claim 13, wherein said path-difference producing means comprises:
- a polarization beam splitter having a face inclined with respect to an optical axis, said polarization beam splitter splitting polarized light;
- two quarter-wave plates disposed along said optical axis so that said polarization beam splitter is sandwiched therebetween; and
- two reflecting mirrors disposed along said optical axis so that said two quarter-wave plates are sandwiched therebetween.

15. A microscope according to claim 13, wherein said path-difference producing means includes a birefringent element.

16. A microscope according to claim 13, wherein said path-difference producing means includes two polarizing prisms.

17. A microscope according to claim 13, wherein said path-difference producing means includes a polarization maintaining fiber.

18. A differential interference microscope comprising:
- a light source;
- variable wavelength means receiving light from said light source, for alternatively emitting light different in wavelength;
- splitting means for selectively breaking up said light from said light source into two polarized components having directions of vibrations perpendicular to each other;
- recombining means for superposing said two polarized components emerging from a sample;
- a polarizing plate disposed so that a transmission axis of said polarizing plate is oriented at a predetermined angle with each of said directions of vibrations of said two polarized components; and
- detecting means for detecting light transmitted through said polarizing plate.

19. A differential interference microscope comprising:
- a light source;
- splitting and recombining means for breaking up light emitted from said light source into two polarized components having directions of vibrations perpendicular to each other, and for superposing said two polarized components reflected from a sample;
- path splitting means disposed between said light source and said splitting and recombining means for dividing an optical path;
- a polarizing plate disposed in said optical path divided by said path splitting means so that a transmission axis of said polarizing plate is oriented at a predetermined angle with each of said directions of vibrations of said two polarized components;
- detecting means for detecting light transmitted through said polarizing plate; and
- path-difference producing means disposed in an optical path between said path splitting means and said splitting and recombining means, for changing a state of polarization of light passing through said path-difference producing means.

20. A microscope according to claim 19, wherein said path-difference producing means comprises:
- a polarization beam splitter having a face inclined with respect to an optical axis, said polarization beam splitter splitting polarized light;
- two quarter-wave plates disposed along said optical axis so that said polarization beam splitter is sandwiched therebetween; and
- two reflecting mirrors disposed along said optical axis so that said two quarter-wave plates are sandwiched therebetween.

21. A microscope according to claim 19, wherein said path-difference producing means includes a birefringent element.

22. A microscope according to claim 19, wherein said path-difference producing means includes two polarizing prisms.

23. A microscope according to any one of claims 2, 12, 18 or 19, wherein a phase difference between said two polarized components is changed to shift in 90° steps so that four output signals are derived from said detecting means, said microscope further comprising a computer to calculate a phase distribution of said sample from said four output signals, based on an equation $$\omega(x,y) = (\lambda/2\pi) \tan^{-1}[(I_4 - I_2)/(I_1 - I_3)]$$

where $\omega$ is a phase distribution of the sample and $I_1$, $I_2$, $I_3$ and $I_4$ are said four output signals from said detecting means.

24. A differential interference microscope comprising:
- a light source;
- splitting means for breaking up light emitted from said light source into two polarized components having directions of vibrations perpendicular to each other;
- recombining means for superposing said two polarized components emerging from a sample;
- a polarizing plate disposed so that a transmission axis of said polarizing plate is oriented at a predetermined angle with each of said directions of vibrations of said two polarized components;
- detecting means for detecting light transmitted through said polarizing plate; and
- variable polarization means disposed on an optical path between said light source and said splitting means, for changing a phase difference between said two polarized components in 90° steps to assume four possible states of polarization of light passing through said variable polarization means, said variable polarization means comprising:

a polarization beam splitter having a face inclined with respect to an optical axis, said polarization beam splitter splitting polarized light;

two quarter-wave plates disposed along said optical axis so that said polarization beam splitter is sandwiched therebetween; and two reflecting mirrors disposed along said optical axis so that said two quarter-wave plates are sandwiched therebetween.

25. A differential interference microscope comprising:

a light source;

splitting and recombining means for breaking up light emitted from said light source into two polarized components having directions of vibrations perpendicular to each other, and for superposing said two polarized components reflected from a sample;

path splitting means disposed between said light source and said splitting and recombining means for dividing an optical path;

a polarizing plate disposed in said optical path divided by said path splitting means disposed so that a transmission axis of said polarizing plate is oriented at a predetermined angle with each of said directions of vibrations of said two polarized components;

detecting means for detecting light transmitted through said polarizing plate; and variable polarization means disposed on an optical path between said light source and said path splitting means, for changing a phase difference between said two polarized components in 90° steps to assume four possible states of polarization of light passing through said variable polarization means, said variable polarization means comprising:

a polarization beam splitter having a face inclined with respect to an optical axis, said polarization beam splitter splitting polarized light;

two quarter-wave plates disposed along said optical axis so that said polarization beam splitter is sandwiched therebetween; and two reflecting mirrors disposed along said optical axis so that said two quarter-wave plates are sandwiched therebetween.

* * * * *